(12) United States Patent
Cogotzi

(10) Patent No.: US 6,835,231 B2
(45) Date of Patent: Dec. 28, 2004

(54) ADSORPTION PROCESS AND APPARATUS FOR NITROGEN PRODUCTION AND DRINK DISPENSING DEVICE MAKING USE OF THE APPARATUS

(76) Inventor: Lorenzo Cogotzi, Viale Libronico, 27/A, Lenno, I-22016 (IT)

( * ) Notice: Subject to any disclaimer, the term of this patent is extended or adjusted under 35 U.S.C. 154(b) by 0 days.

(21) Appl. No.: 10/343,634

(22) PCT Filed: Aug. 2, 2001

(86) PCT No.: PCT/IT01/00429

§ 371 (c)(1),
(2), (4) Date: Aug. 22, 2003

(87) PCT Pub. No.: WO02/10066

PCT Pub. Date: Feb. 7, 2002

(65) Prior Publication Data

US 2004/0011199 A1 Jan. 22, 2004

(30) Foreign Application Priority Data

Aug. 2, 2000 (IT) ..................................... MI2000A1797

(51) Int. Cl.$^7$ .......................................... B01D 53/053
(52) U.S. Cl. .............................. 95/19; 95/96; 95/138; 96/110; 96/113; 96/114; 96/115; 96/130; 96/143
(58) Field of Search .............................. 95/19, 21, 22, 95/96–106, 138, 130; 96/110, 130, 113–115, 143, 144

(56) References Cited

U.S. PATENT DOCUMENTS

| | | | | |
|---|---|---|---|---|
| 4,440,548 A | * | 4/1984 | Hill | 95/100 |
| 4,494,966 A | * | 1/1985 | Umeki | 95/102 |
| 4,572,723 A | | 2/1986 | Ward | |
| 4,576,614 A | * | 3/1986 | Armond et al. | 95/23 |
| 4,925,461 A | | 5/1990 | Gemba et al. | |
| 4,995,889 A | * | 2/1991 | Abel et al. | 95/22 |
| 5,176,722 A | * | 1/1993 | Lemcoff et al. | 95/102 |
| 5,228,888 A | | 7/1993 | Gmelin et al. | |
| 5,275,640 A | * | 1/1994 | Schroter et al. | 95/101 |
| 5,346,536 A | | 9/1994 | Kaneshige et al. | |
| 5,382,280 A | * | 1/1995 | Choe et al. | 95/98 |
| 5,472,480 A | * | 12/1995 | Barbe | 95/54 |
| 5,868,944 A | | 2/1999 | Wright | |
| 5,989,313 A | * | 11/1999 | Mize | 95/10 |
| 6,090,185 A | * | 7/2000 | Monereau et al. | 95/102 |
| 6,270,556 B1 | * | 8/2001 | Rouge et al. | 95/22 |
| 6,277,174 B1 | * | 8/2001 | Neu et al. | 95/12 |
| 6,579,346 B1 | * | 6/2003 | Esselink | 95/98 |
| 2002/0134234 A1 | * | 9/2002 | Kalbassi et al. | 95/11 |
| 2003/0097931 A1 | * | 5/2003 | Kawai et al. | 95/96 |

FOREIGN PATENT DOCUMENTS

| | | |
|---|---|---|
| EP | 0380723 | 8/1990 |
| EP | 0450785 | 10/1991 |
| EP | 0561340 | 9/1993 |
| EP | 0853062 | 7/1998 |
| GB | 2331254 | 5/1999 |

* cited by examiner

Primary Examiner—Robert H. Spitzer
(74) Attorney, Agent, or Firm—Millen, White, Zelano, Branigan, P.C.

(57) ABSTRACT

In a process for the production of nitrogen by adsorption on carbons or similar molecular sieves contained in a cylinder (2), the amount of Q1 of nitrogen obtainable from the cylinder at the required purity at the cylinder pressure Pp is calculated; compressed air is fed to the cylinder which is brought to a pressure value at least equal to the pressure Pp and in any case greater than the pressure present in a collecting reservoir (3); at any cycle a fixed amount Q2 (where Q1≧Q2) of gas is transferred from the adsorber cylinder to the reservoir (3) and the cylinder is depressurised after each transfer to regenerate carbons. Also claimed are an apparatus for the production of nitrogen, the use of such an apparatus is a drink dispensing device and a drink dispensing device comprising such an apparatus.

10 Claims, 6 Drawing Sheets

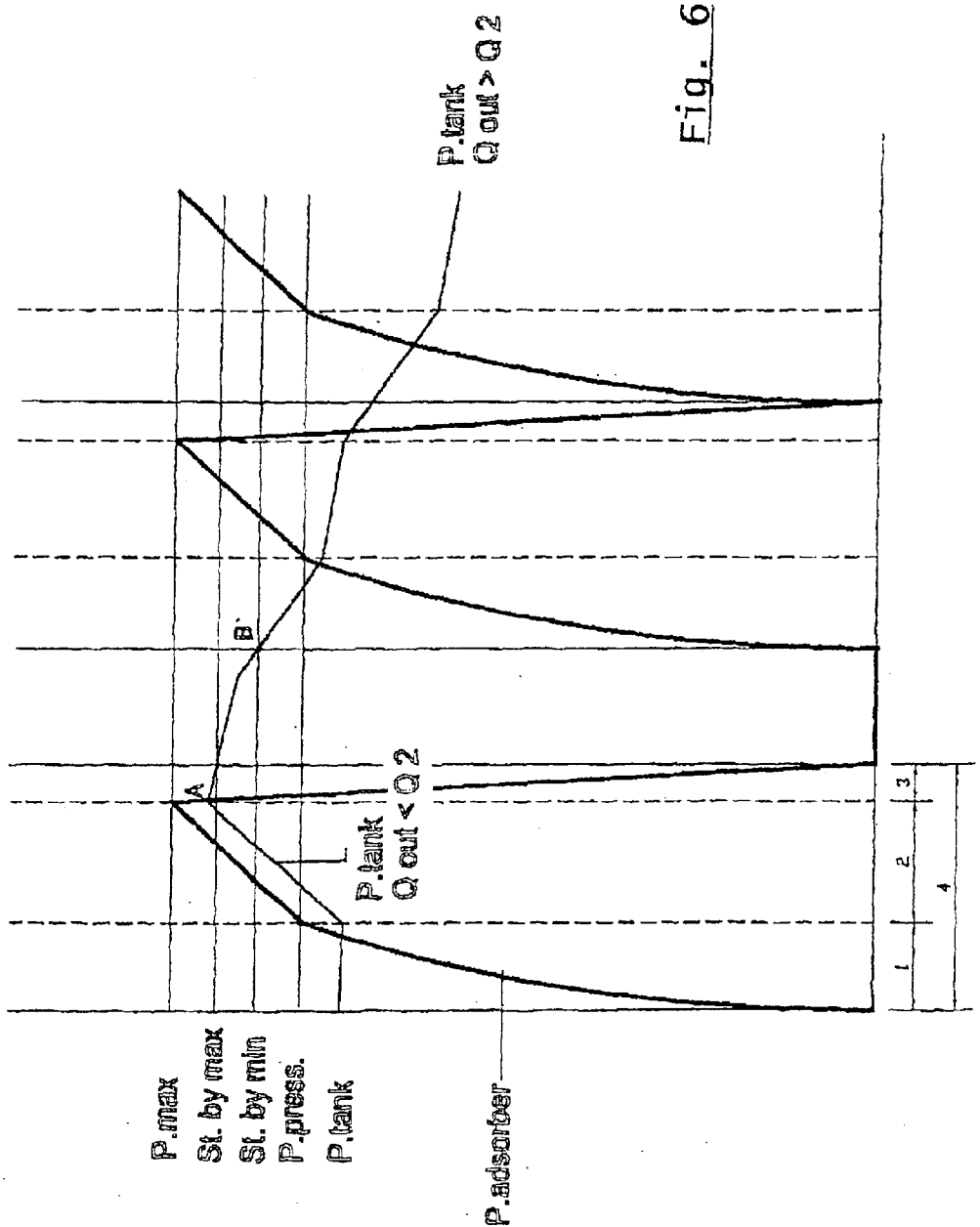

ADSORPTION PROCESS AND APPARATUS FOR NITROGEN PRODUCTION AND DRINK DISPENSING DEVICE MAKING USE OF THE APPARATUS

FIELD OF THE INVENTION

The present invention relates to an adsorption process and an apparatus for the production of nitrogen; in particular the invention relates to a process and an apparatus for the production of gaseous nitrogen at preset and constant purity under conditions of variable pressure and flowrate of the gas supplied to the final user. The invention also relates to the use of said apparatus in drink dispensers, such as beer and wine dispensers.

BACKGROUND OF THE INVENTION

In many nitrogen gas applications, such as the one cited above or for example in plants for food packaging in protected or modified atmosphere, if on the one side it is desirable to avoid using cylinders connected to the apparatus that uses the gaseous nitrogen, on the other consumptions or room available are such as to make impossible the use of large fixed reservoirs of the type used in hospitals and research laboratories. Rather, for above applications in situ production devices are used, that are based on oxygen adsorption from a compressed air flow that is passed through columns packed with carbon (or coke) molecular sieves; the exiting nitrogen is fed to a collecting reservoir and hence to the final use, e.g. a beer tapping column or dispenser.

U.S. Pat. No. 4,572,723 describes an apparatus comprising a compressor, means for filtering and dehumidifying compressed air, an adsorber vessel containing molecular sieves and a reservoir to receive the purified nitrogen exiting the adsorber vessel. The regeneration of the molecular sieves is achieved by depressurising the adsorber vessel: by this operation almost all adsorbed oxygen is vented to the atmosphere.

One of the problems of the known devices is that nitrogen purity is not fixed and constant being a variable depending on some factors such as: the rate and flow of the compressed air stream, the amount of nitrogen produced in each cycle, the pressure of nitrogen collected in the reservoir, which, on its turn, is a variable depending on the flow of nitrogen drawn and sent to the final user. To overcome this drawback some solutions have been proposed: one of these envisages the introduction of a buffer tank to be placed between the adsorber column and the collecting reservoir; another is that of using two adsorbers (e.g. in U.S. Pat. No. 4,925,461 and in U.S. Pat. No. 5,382,280) and to have the exiting flow move from the first to the second adsorber to remove oxygen traces. These solutions however involve cost increases, greater room needs and longer production times; moreover, they do not solve the problem in that they do not ensure the required fixed and constant purity of gaseous nitrogen product.

DESCRIPTION OF THE INVENTION

The object of the present invention is to solve the aforesaid problems and to provide an adsorption process and apparatus for the production of nitrogen gas that has low costs and results in nitrogen generation at the desired purity (generally with oxygen content within the range of 5 ppm to 2%) without being strictly bound to the flowrate value of the feed air stream.

A further object of the invention is to provide an apparatus capable of transferring from the molecular sieve vessel to the collecting reservoir, over the time of a cycle duration, a calculated and established amount of nitrogen gas, at a predetermined transfer pressure, independently of the pressure value in the collecting reservoir, of the instant nitrogen consumption and, within certain limits, of the flowrate of the feed air without being strictly bound to the pressure value of the reservoir that can vary in the range of 1 to 10 bar and without limitations to the gas instant drawing that can exceed the specified values.

These objects are achieved by means of the present invention; that relates to a process for the production of nitrogen comprising the steps of: feeding compressed air to an adsorber cylinder containing a plurality of adsorbent means for removing oxygen from said air until said adsorber cylinder is pressurized; feeding product gas flow exiting said cylinder to a collecting reservoir; depressurising said adsorber cylinder to regenerate said adsorbent means and cyclically repeating said steps, characterized in further comprising the steps of: calculating the amount Q1 of nitrogen gas obtainable from said adsorber cylinder with the required purity at pressure Pp of the cylinder; bringing said cylinder to a pressure value at least equal to said pressure Pp and in any case exceeding the pressure present in said collecting reservoir; and transferring in each cycle from said adsorber cylinder to said reservoir a fixed gas amount Q2, where $Q1 \geq Q2$.

The process includes three steps:

Pressurisation step during which air is compressed within the cylinder until at least the preset pressure value Pp or in any case a value exceeding Pp and capable of transferring nitrogen from the cylinder 2 to the tank 3 is reached.

Transfer step during which the amount Q2 of nitrogen gas at the desired purity is transferred from the cylinder into the collecting reservoir: the transferred amount is constant and controlled by a flow regulator.

Depressurisation step during which oxygen is vented from the cylinder.

According to a feature of the invention pressure is measured inside the adsorber cylinder and inside the collecting reservoir and if the cylinder pressure is lower than the tank pressure, before starting the transfer step compressed air continues to be fed to the cylinder until a pressure value exceeding that of the tank is reached.

According to a preferred feature of the invention the transfer step is carried out at preset and constant flowrate and the flow of the transferred gas is shut off after a present and constant time for each cycle. According to a further feature of the invention, compressed air is fed to said cylinder during said transfer step and compressed air feeding is interrupted at the end of the transfer step.

The invention also relates to an apparatus for nitrogen production comprising a compressed air source (1, 1A); at least one cylinder (2) containing means for oxygen adsorption; a reservoir (3) to collect the product gas exiting said cylinder and means (7) to transfer said gas from said cylinder (2) to said reservoir (3), wherein said apparatus further comprises means (19, 20) to measure pressure in said cylinder (2) and in said reservoir (3); means (9) to measure and regulate said gas flow in said transfer means, said regulating means (9) being set to transfer a fixed and constant volume of gas; and means (8) to stop said transfer once a preset amount Q2 of gas has been transferred.

According to a preferred embodiment of the invention the apparatus also includes means to measure and regulate the duration of the transfer time, the pressurisation time and the depressurisation or venting time.

Preferably, the measuring and regulating means include at least a pressure gauge, a timer, a flow regulator and an on-off valve, all connected to a microprocessor controlled system.

According to a further feature of the invention, the apparatus also includes means to cut off the compressed air stream feeding or, if provided, the compressor operation, both once the required nitrogen amount Q2 is transferred or in case a maximum preset pressure in the reservoir should be reached due to a reduced gas consumption by the user.

As mentioned above, a particularly advantageous application of the apparatus according to the invention is in apparatuses for dispensing or drawing drinks such as beer, wine and beverages in general. It is therefore a further object of the invention the use of the aforedescribed apparatus, as defined in claim 10. Another object of the invention is therefore a device for delivering Pr drawing drinks comprising an apparatus of the aforedescribed type.

As mentioned above, the apparatus and process of the invention allow to obtain several advantages versus the prior art.

First of all the transfer of nitrogen from the cylinder to the reservoir is totally independent of the pressure of the gas collected inside said reservoir. In fact, according to the invention, a preset gas amount is transferred from the cylinder to the reservoir independently of the pressure in the reservoir, in order to avoid that the transferred nitrogen has a purity degree other than the required one. Another advantage is that, unlike other known processes where a supplementary reservoir is introduced, named Buffer Tank or Surge Tank, which must necessarily be maintained at a reference pressure, the process of the invention allows to eliminate the Buffer Tank and the pressure in the collecting reservoir may vary in the range of 1 to 10 bar without involving any problem for the purity and generation of nitrogen. Thanks to this feature it is possible to draw more nitrogen gas from the reservoir than it was possible with the traditional systems, without the transferred nitrogen being polluted by a higher oxygen percentage than the established one.

Moreover, the systems for dispensing and drawing drinks including the apparatus according to the invention are more flexible and easy to be used than the traditional ones: for example, the apparatus ensures the interchangeability of the compressor, if necessary, without requiring adjustments and/ or calibrations in case the compressor is replaced with another compressor having different characteristics within a 20% range; this result is not achievable in traditional systems.

BRIEF DESCRIPTION OF THE DRAWINGS

FIGS. 4–6 are graphs illustrating the pressure levels in the adsorber cylinder and in the reservoir under different operating conditions.

DESCRIPTION OF THE PREFERRED EMBODIMENT

Figure 1:
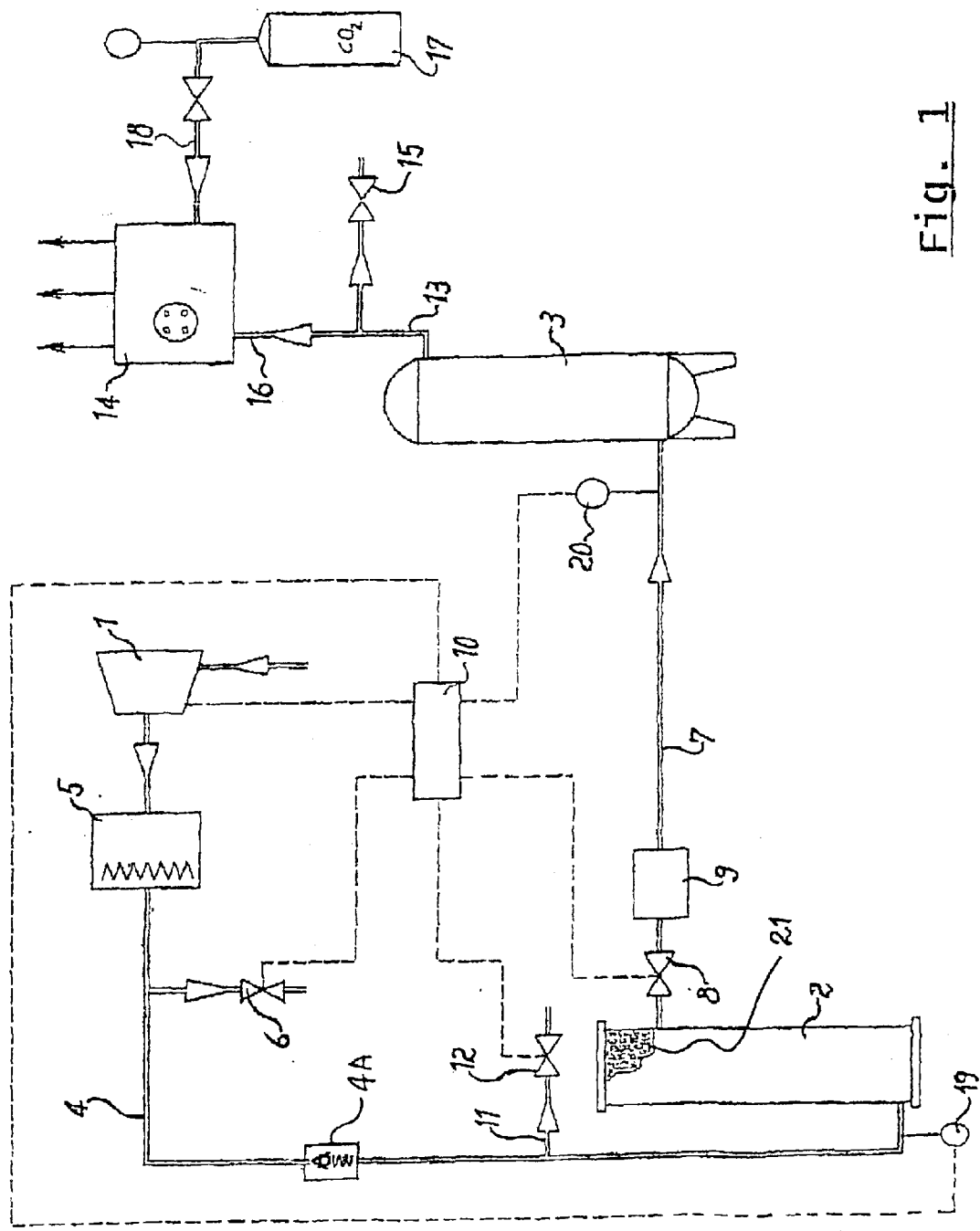
FIG. 1 shows in diagrammatic form an apparatus according to the invention.

As shown in FIG. 1, the apparatus includes a source of compressed air, which in this case is a compressor 1 but it may also consist in a device for transferring compressed air from a piping system through a valve 1A (FIG. 2), an adsorber cylinder 2 and a reservoir 3. The compressor is preferably of the type free of oil and connected to cylinder 2 by means of a conduit 4; between compressor and cylinder there is provided a system 5 to dehumidify and filter the compressed air exiting the compressor and between the latter and the cylinder 2 at least one non-return valve 4a is provided. On conduit 4, upstream of non-return valve 4a, a valve 6 is provided, which ensures the compressor depressurisation during startup. Said valve is schematically indicated in the figure and is preferably a solenoid valve.

The cylinder 2 contains carbons (coke) having the function of molecular sieves. 21 capable of removing oxygen from the compressed air stream passing through the cylinder; this type of means to remove oxygen by adsorption is known in the technique, for instance in the aforementioned US patents, and they are commercially available. Suitable sieves are for example those using. CarboTech-Anlagembau carbons and performing the process protected by the European Patent N° 0169336.

On conduit 4, downstream of the non-return valve and close to the cylinder inlet side, with respect to the normal compressed air stream, there is provided a conduit 11 equipped with a valve 12 for venting air during the regeneration of the molecular sieves 21.

The outlet of the cylinder 2 is connected through a conduit 7 to reservoir 3, where purified nitrogen is collected. On said conduit, at the cylinder outlet, there are provided means to measure and regulate the product gas flow from cylinder 2 to reservoir 3. In the illustrated preferred embodiment said means comprise an on-off valve 8 and a flow regulator 9; the flow regulator regulates the flowrate of nitrogen during its transfer from the cylinder to the reservoir; the flow regulator used is of the type with nozzle and plate and negative feedback membrane. Flowmeters too can be used to measure and regulate the transfer flow, but the solution shown is preferred for cost reasons. As mentioned above, unlike the known technique, the nitrogen amount Q2 exiting the cylinder 2 must always be the same for each cycle, independently of the pressure present in the reservoir 3; the flow regulator 9 is therefore set for such a flowrate $F_{trasf}$ as to ensure that, at the end of the transfer time $T_{trasf}$, fixed as well, the amount of nitrogen transferred to the collecting tank, or reservoir 3, is Q2.

At least two pressure transducers, 19 and 20, are also present to measure the pressure in cylinder 2 and reservoir 3. There are also provided control means 10, usually computerized means, to detect the signals generated by the pressure transducers 19 and 20 and to control the switching on or off of the compressor 1 and the opening or closing of valves 6, 8 and 12.

In the embodiments shown in the drawings, the conduit 13 at the outlet of the reservoir 3 is provided with at least one valve 15 to regulate the drawing of nitrogen from the reservoir and it is also provided with a branch 16 to connect the reservoir 3 to a mixer 14, known per se in the art. The mixer 14 is on its turn connected to a $CO_2$ source 17 by means of a conduit 18. The mixer operates in a known way to prepare mixtures of nitrogen and carbon dioxide with different compositions according to the drinks to be dispensed; the mixer in itself is not an object of the present application, whereas it is an object of this application any type of drink dispensing system or device that includes the apparatus according to the invention.

Figure 2:
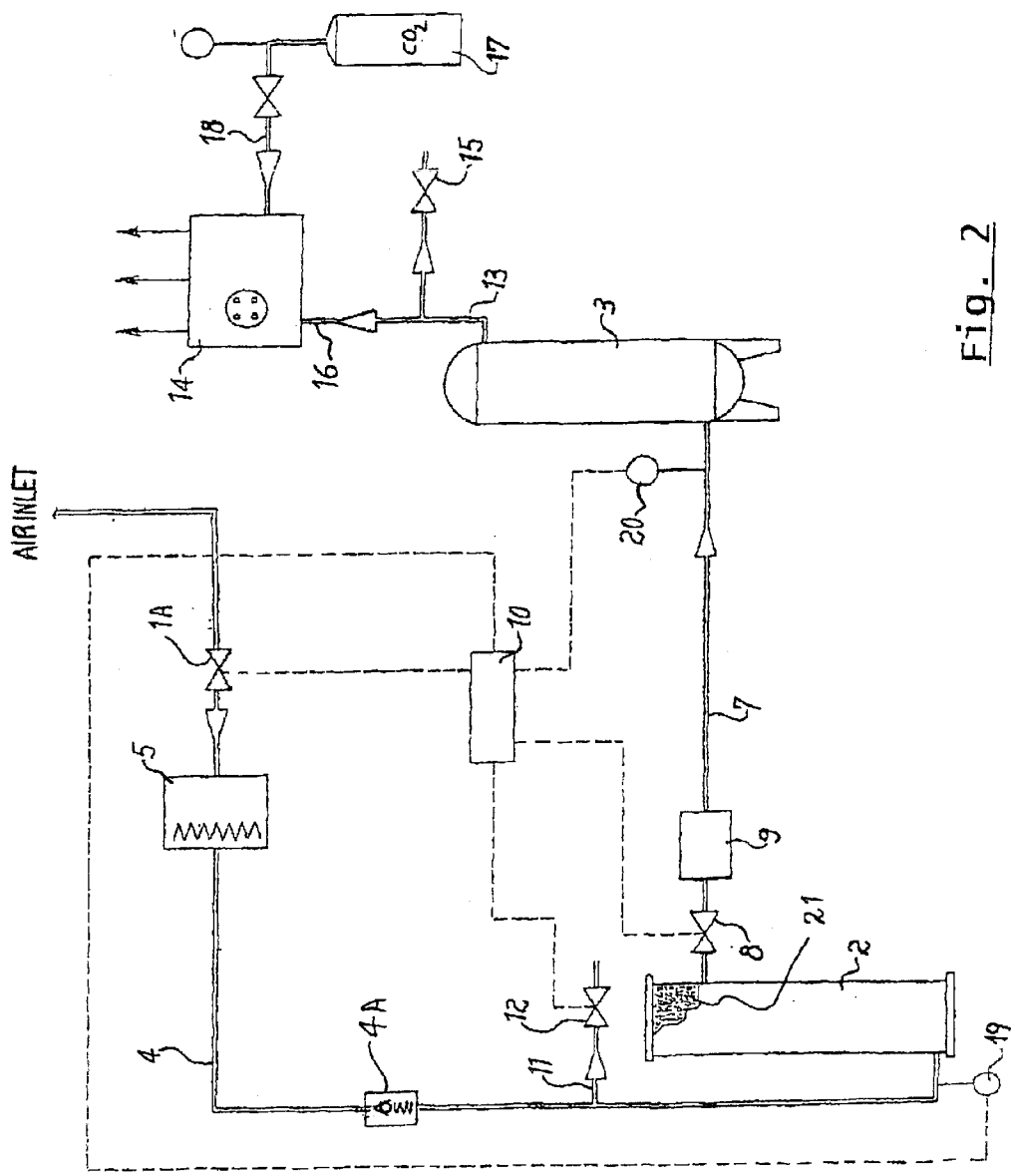
FIG. 2 is a diagrammatic view of an apparatus similar to that of FIG. 1, wherein air is fed from a piping system.
Figure 3:
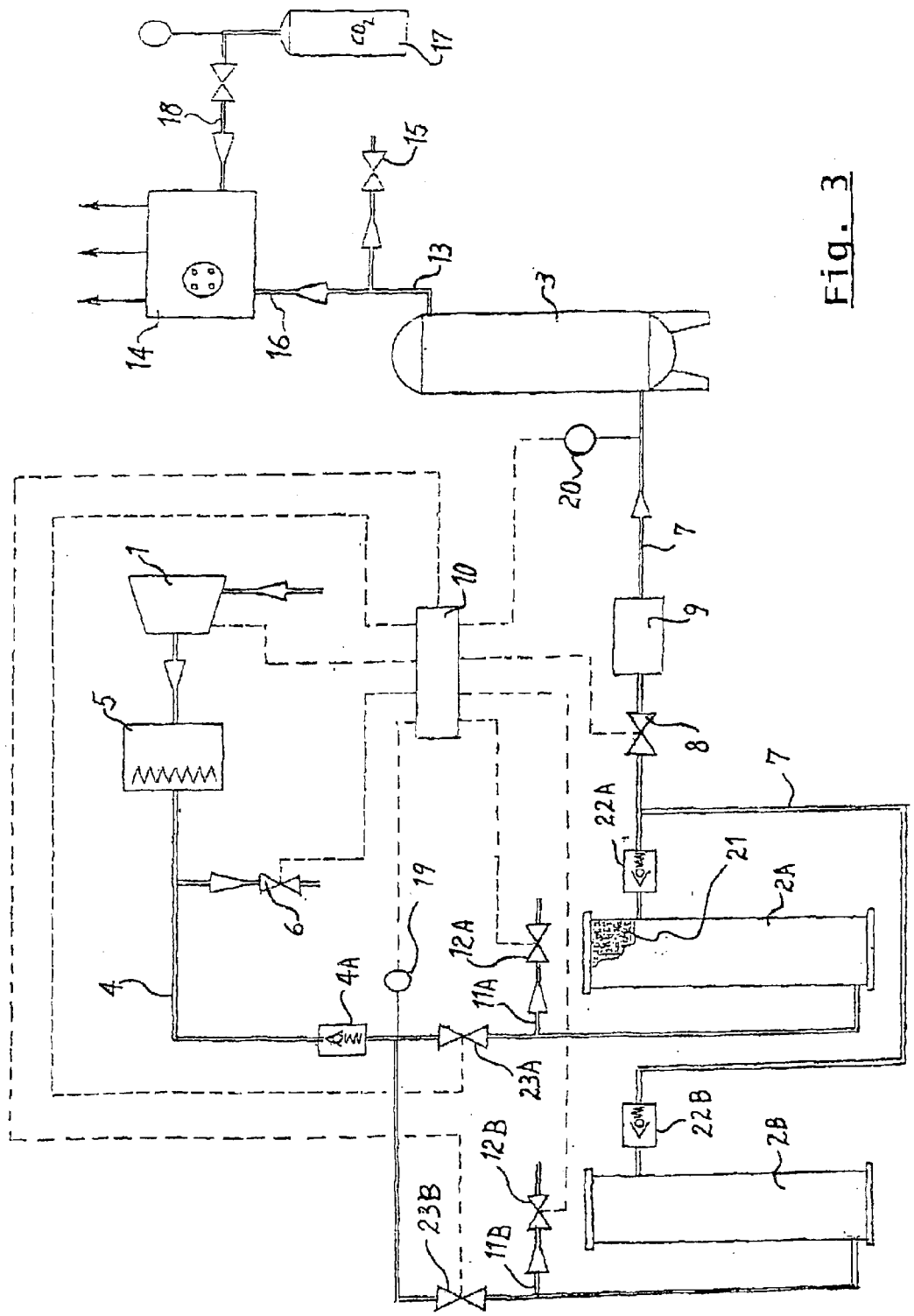
FIG. 3 is a diagrammatic view of an apparatus provided with two adsorber cylinders.

FIG. 3 is a chart showing an apparatus provided with two cylinders, 2A and 2B, which are actuated in sequence to feed a continuous flow of nitrogen gas to reservoir 3. Each cylinder is equipped with an on-off valve 23A and 23B, conduits 11A and 11B equipped with a venting or depressurisation valve, 12A and 12B, upstream of the cylinder, and with a non-return valve, 22A and 22B, on the outlet conduit 7. A similar apparatus, provided with two adsorber cylinders to be alternatively actuated, can be obtained with air feeding from a piping system, as shown in FIG. 2.

The operation of the apparatus according to the process of the invention is based on the concept of producing in each cycle and of transferring into the reservoir, always and exclusively a nitrogen amount Q2 corresponding to the specified flowrate multiplied by the time of the transfer duration according to the relation $Q2 = V_{trasf} = F_{trasf} \times T_{trasf}$, where $V_{trasf}$ is the volume of nitrogen gas transferred from cylinder 2 to reservoir 3, $T_{trasf}$ is the transfer time and $F_{trasf}$ is the nitrogen flow exiting the cylinder through flow regulator 9. The amount Q2 shall never exceed the maximum nitrogen volume Q1 obtainable from the cylinder 2 at a pressurisation pressure Pp of cylinder 2.

The value of the amount Q1 depends on the characteristics of the molecular sieve, which allow to determine the nitrogen volume that can be produced in each cycle at the required purity, being the sieve volume and: the pressurisation pressure value Pp known. This data is generally supplied by the sieve manufacturer or obtained from the efficiency curves indicated by the sieve manufacturer and optionally it is experimentally checked.

The nitrogen production process takes place repeatedly in an independent and automatic way in a cycle in which three steps are performed according to the following relation: $T_c = T_{press} + T_{trasf} + T_{sc}$ where $T_c$ is the cycle time, $T_{press}$ is the time necessary to bring the cylinder to the pressure value above which the transfer step can start, $T_{sc}$ is the venting time (or depressurisation time) during which the cylinder sieves regenerate.

The cycle time must be determined in a way to allow operation taking place in the following way.

Based on the data relating to the type of sieves, their amount and the adsorber cylinder characteristics, it is possible to obtain the maximum nitrogen amount Q1 to be produced in the cylinder 2 at the required purity, for instance oxygen not exceeding 0.25%, by applying the formula:

$Q1 = V_{carb} \times Ft$, where Ft is a correction factor experimentally found for a given type of cylinder and carbons and assuming different values according to the desired nitrogen purity.

Q1 can also be calculated by the following formula, once the desired purity and therefore the cylinder pressurisation pressure Pp are set, and on the basis of the air stream flowrate and, of course, on the basis of the data relating to the sieves:

$$Q1 = F_{comp} - \frac{V_{carb} \times Pp \times 60}{T_{press}}$$

where
$F_{comp}$=flowrate (l/min) of compressed air
$V_{carb}$=sieves volume (l)
Pp=pressurisation pressure of the cylinder (bar)
$T_{press}$=pressurisation time (sec)

The amount really transferred Q2 is smaller or equal to the maximum amount Q1. If it is decided to use Q2<Q1, the flow regulator shall be adjusted accordingly to deliver no more than said amount Q2.

The nitrogen flowrate from the cylinder 2 through the flow regulator 9, i.e. $F_{trasf}$, is set as a function of the specified flowrate, namely the flowrate at the reservoir 3 outlet ($F_{out}$) required for the apparatus, and of the cycle time $T_c$. Other parameters used are pressurisation time $T_{press}$ and venting time $T_{sc}$. As an example, if the specified flowrate required at reservoir outlet $F_{out}$ is liters per minute, assuming the transfer time $T_{trasf}$ be one minute and the cycle time $T_c$ three minutes (with $T_{press}$=1 min and $T_{sc}$=1 min), the transfer flowrate $F_{trasf}$ will be:

$F_{trasf} = F_{out} \times T_c / T_{trasf} = 4 \times 3 : 1 = 12$ liters/min

The other parameters will be determined accordingly using the following formulae:

$Q2 = F_{out} \times T_c$ $T_c = T_{press} + T_{trasf} + T_{sc}$ $F_{trasf} = F_{out} \times T_c / T_{trasf}$ Then the compressor 1 is actuated (FIG. 1) or the valve 1A is open (FIG. 2), starting the pressurisation step, and compressed air is fed to the cylinder until it is brought to pressure Pp, i.e., pressurisation pressure, which is advantageously the highest possible (e.g. 8.5 bar), consistently with the characteristics of the compressor. The pressurisation time is preferably less than 60 seconds.

When the pressurisation pressure is reached, measured by the transducer 19, the pressurisation step is over and, if the pressure in the cylinder is higher than that in the reservoir 3, the transfer step is started. In this step (duration $T_{trasf}$), the valve 8 is opened and the product gas begins to flow therethrough and through the flowrate regulator 9 into reservoir 3.

If the pressure in the cylinder 2, measured by the transducer 19, is lower than that in the reservoir 3, measured by the transducer 20, before starting the transfer step, it is necessary to wait until the pressure in the cylinder increases to exceed the pressure in the reservoir by a value capable of ensuring the gas transfer; the pressure difference required is generally at least 100 mbar and preferably 300 mbar. During the transfer time the flow regulator regulates the flowrate in a way that the volume of transferred nitrogen, corresponding to the amount Q2, does not exceed the maximum amount allowed according to the previously indicated relation, the pressure difference on its turn ensures that all the amount Q2 is transferred. The feeding of pressurised air is continued during the whole transfer step and preferably the pressure inside the cylinder further increases to a pressure Pmax (FIGS. 4–6).

Once the transfer of the nitrogen amount Q2 has taken place, valve 8 is closed to cut off the transfer and compressor 1, which had been in operation for the whole duration of the pressurisation and transfer time, is switched off. In case of air supply from network, instead of the compressor the valve 1a shall be actuated. It is important to note that, according to the invention, the transfer step is preferably at a fixed flowrate and of an established and fixed duration to always ensure that the same calculated amount of nitrogen is transferred in a cycle. On the contrary the pressurisation time may vary if the pressure in the cylinder, when there is no nitrogen consumption, is at a value exceeding that fixed for pressurisation and the pressure in the cylinder 2 must be raised of at least 300 mbar more as described above.

At this point, the valve 8 being closed, the sieves are regenerated in a way known in the technique, i.e. opening the valve 12 and depressurising the cylinder 2 though the conduit 11. The apparatus is then ready for a new cycle. The two tanks 2A and 2B shown in FIG. 3 are actuated in sequence but following the same aforedescribed concept, that is to say calculating the maximum amount of nitrogen that can be produced at the required purity, bringing the cylinder to at least pressure Pp (or at least 100 mbar, preferably 300 mbar above the pressure of the reservoir 3) and transferring in each cycle the same calculated nitrogen amount Q2 to the reservoir 3.

Figure 4:
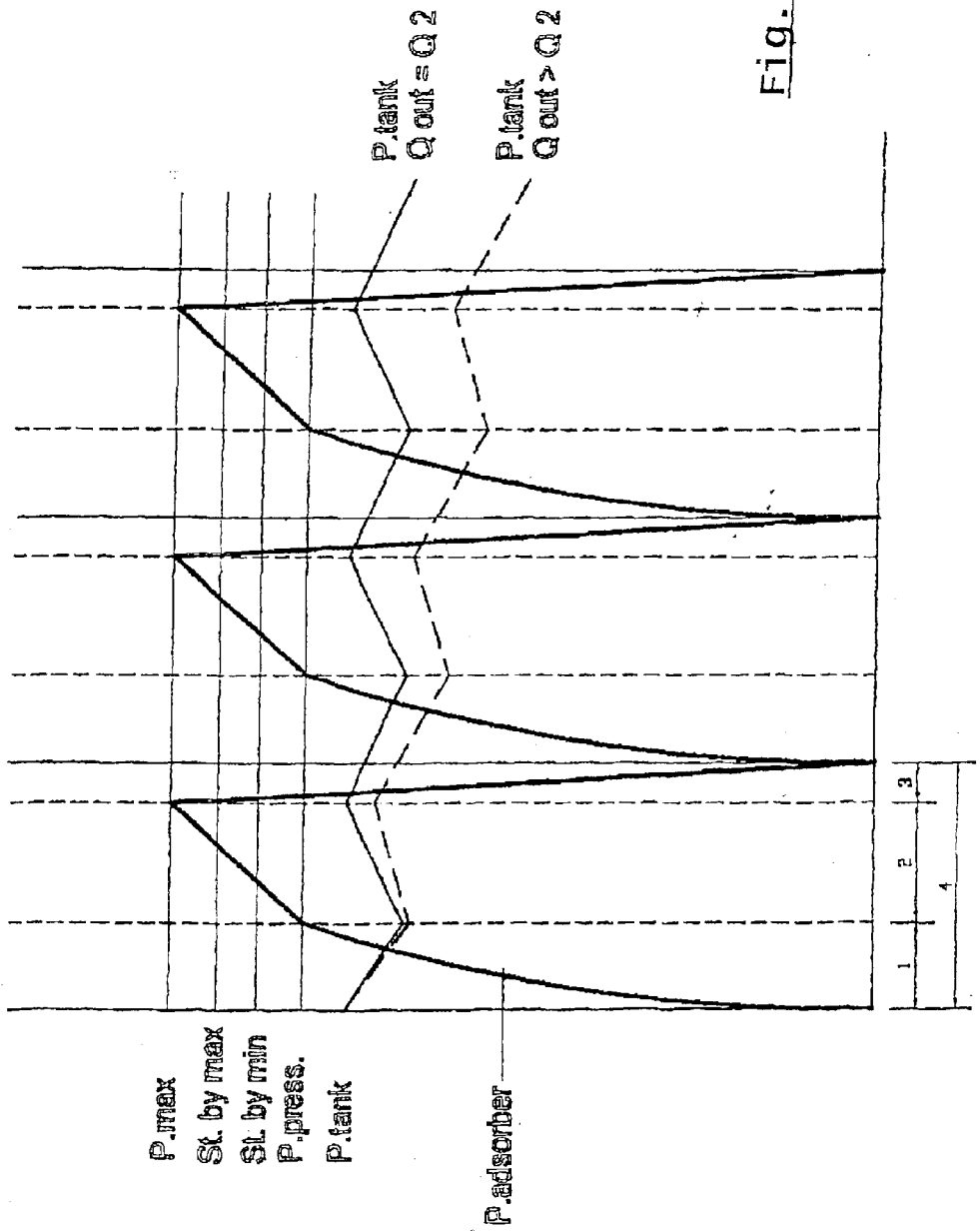
Figure 5:
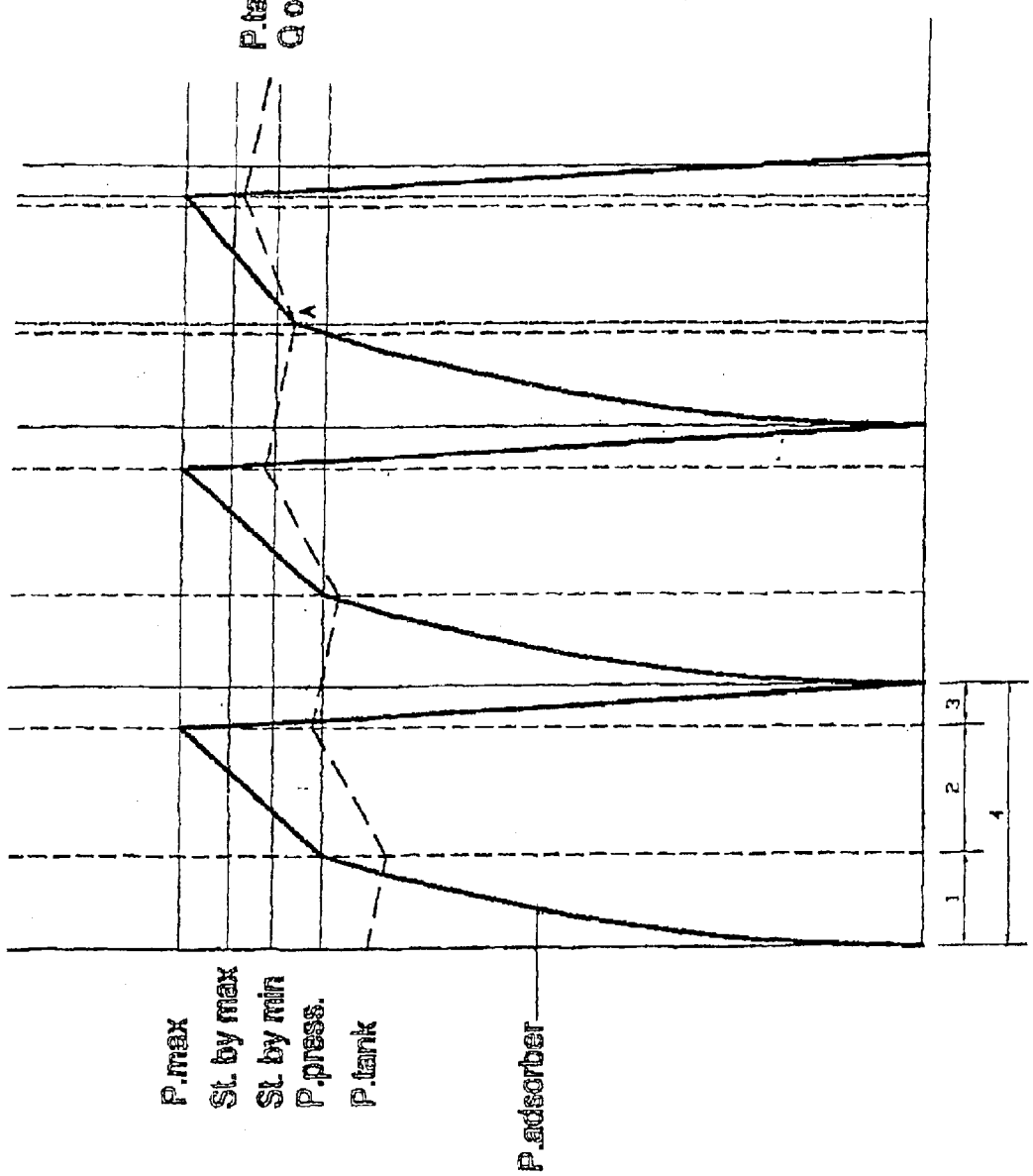

In any case, if reservoir 3 has reached a peak pressure value indicated by St.by max in FIGS. 4–6 and is no longer capable of receiving nitrogen from the cylinder(s) since nitrogen has not been consumed, the cycle stops and does not start until enough nitrogen has been consumed and the pressure has fallen to the St.by min value.

FIGS. 4–6 show the pressure curves inside the cylinder 2 during the apparatus operation and highlight how the nitrogen production remains constant independently of the instant consumption of nitrogen (nitrogen exiting the reservoir 3). In these figures, P.max indicates the peak value reached in the cylinder 2 during the transfer step, when compressed air continues to be fed to the cylinder 2 at higher flowrate than the transfer one. Numbers 1, 2, 3 and 4 reported on abscissae in the graphs indicate pressurisation, transfer, vent and cycle times respectively. St.by max and St.by min are the maximum and minimum pressure values in the cylinder 2 when the apparatus stops and resumes operation. FIG. 4 shows the pressure curve (P.adsorber) in the adsorber cylinder 2, which has the same values in all subsequent cycles since the nitrogen amount produced and transferred in each cycle is always the same independently of the pressure value of the reservoir which varies according to the instant consumption of nitrogen. The pressure curve of reservoir tank 3 (P.tank) is indicated as a dashed line in case nitrogen consumed in a cycle is greater than nitrogen produced ($Q_{out}$>Q2) and as a continuous line in case the consumption of nitrogen in a cycle is equal to the nitrogen produced ($Q_{out}$=Q2). FIG. 5 shows the pressure curves in cylinder 2 and in reservoir 3 when $Q_{out}$<Q2, that is when the nitrogen consumption is smaller than nitrogen produced. In this case, when the pressure in reservoir 3 reaches a value exceeding that of pressurisation Pp, the pressurisation time $T_{press}$ (1 in the graph) increases, while the transfer time $T_{trasf}$ (2 in the graph) remains constant, which means that a constant amount of nitrogen is transferred in all cycles. The transfer takes place when the curve P.adsorber intersects the curve P.tank in point A and continues for all the time established in the process.

FIG. 6 shows the pressure curves in adsorber 2 and in reservoir 3 in case of a non uniform nitrogen consumption. Initially (first cycle) the consumption is lower than production and the P.tank value increases to the stand-by maximum level A; at this point operation is interrupted and the production of nitrogen stopped at the end of the vent and sieves regeneration step until P.tank decreases to the stand-by minimum level (intersection point B). At this point the production of nitrogen gas is resumed with a consumption greater than production ($Q_{out}$>Q2) and it will go on as established. The nitrogen available will eventually be only the amount produced in each cycle.

What is claimed is:

1. A process for the production of nitrogen gas comprising the steps of: feeding compressed air to an adsorber cylinder (2) containing a plurality of adsorbent means for removing oxygen from said air until said adsorber cylinder is pressurized; feeding product gas flow exiting said cylinder (2) to a collecting reservoir (3); depressurising said adsorber cylinder to regenerate said adsorbent means and cyclically repeating said steps, characterized in further comprising the steps of: calculating the amount Q1 of nitrogen gas obtainable from said adsorber cylinder with the required purity at pressure Pp of the cylinder; bringing said cylinder to a pressure value at least equal to said pressure Pp and in any case exceeding the pressure present in said collecting reservoir; and transferring in each cycle from said adsorber cylinder (2) to said reservoir (3) a fixed gas amount Q2, where Q1≧Q2.

2. A process according to claim 1, wherein the feeding of the product gas flow exiting cylinder (2) to a collecting reservoir (3) takes place after said adsorber cylinder (2) has been pressurized at a pressure 300 mbar higher than the pressure in said reservoir (3).

3. A process according to claim 1, wherein, in for the feeding of the product gas flow exiting cylinder (2) to a collecting reservoir (3), the amount of gas flow is measured and regulated over a preset and constant transfer time.

4. A process according to claim 1, comprising the steps of: feeding compressed air to said adsorber cylinder (2) until at least said pressure Pp is reached; connecting said cylinder to said reservoir by means of a flow regulator (9) to transfer gas from the cylinder to the reservoir; setting a flowrate of nitrogen gas through said flow regulator (9); transferring said gas through said flow regulator (9) for a preset time in a way to transfer said amount Q2; stopping said transfer when said amount Q2 is reached; cutting off compressed air feeding to said cylinder (2); regenerating said adsorbent means.

5. A process according to claim 1, further comprising the steps of feeding pressurized air to said cylinder (2) during the step the feeding of the product gas flow exiting cylinder (2) to a collecting reservoir (3) and of discontinuing said feeding of pressurized air when the step of feeding of the product gas flow exiting cylinder (2) to a collecting reservoir (3) is over.

6. An apparatus for the production of nitrogen, comprising a compressed air source (1, 1A); at least one cylinder (2) containing means for oxygen adsorption; a reservoir (3) to collect the product gas exiting said cylinder and means (7) to transfer said gas from said cylinder (2) to said reservoir (3), wherein said apparatus further comprises means (19, 20) to measure pressure in said cylinder (2) and in said reservoir (3); means (9) to measure and regulate said gas flow in said transfer means, said means (9) to measure and regulate gas flow being set to transfer a fixed and constant volume of gas; and means (8) to stop said transfer once a preset amount Q2 of gas has been transferred.

7. An apparatus according to claim 6, wherein said means to measure and regulate gas flow comprises at least two pressure transducers, a flow regulator (9) and at least one on-off valve (8).

8. An apparatus according to claim 6, further comprising means (6, 1a) to cut off feeding of compressed air once said amount of nitrogen gas Q2 has been transferred.

9. An apparatus according to claim 6, further comprising means (14) for mixing nitrogen gas exiting said reservoir (3) with carbon dioxide exiting a separate tank (17).

10. A drink dispensing device comprising sources of pressurized gas, wherein an apparatus for nitrogen production according to claim 6 is included.

* * * * *